United States Patent Office 2,714,338
Patented Aug. 2, 1955

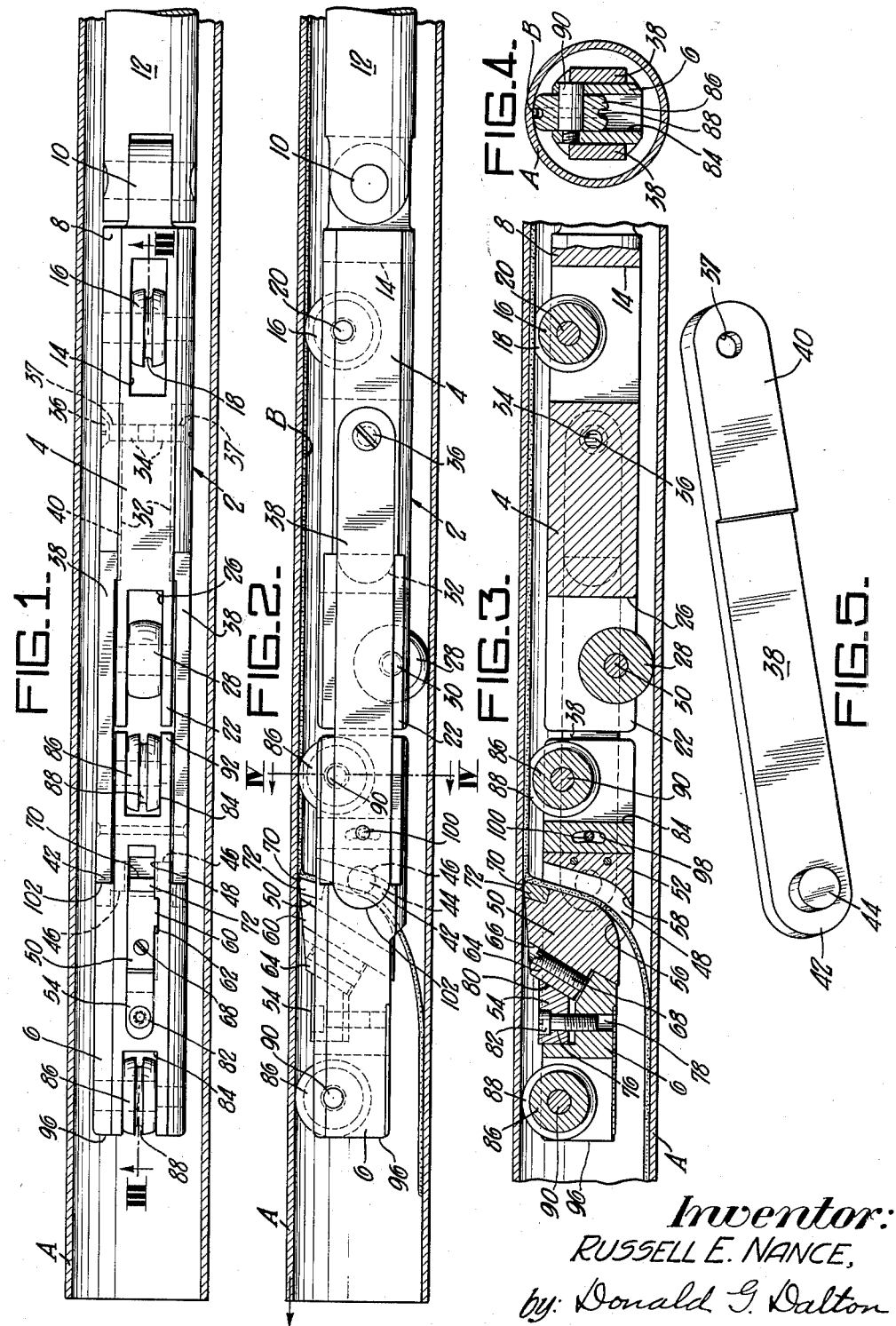

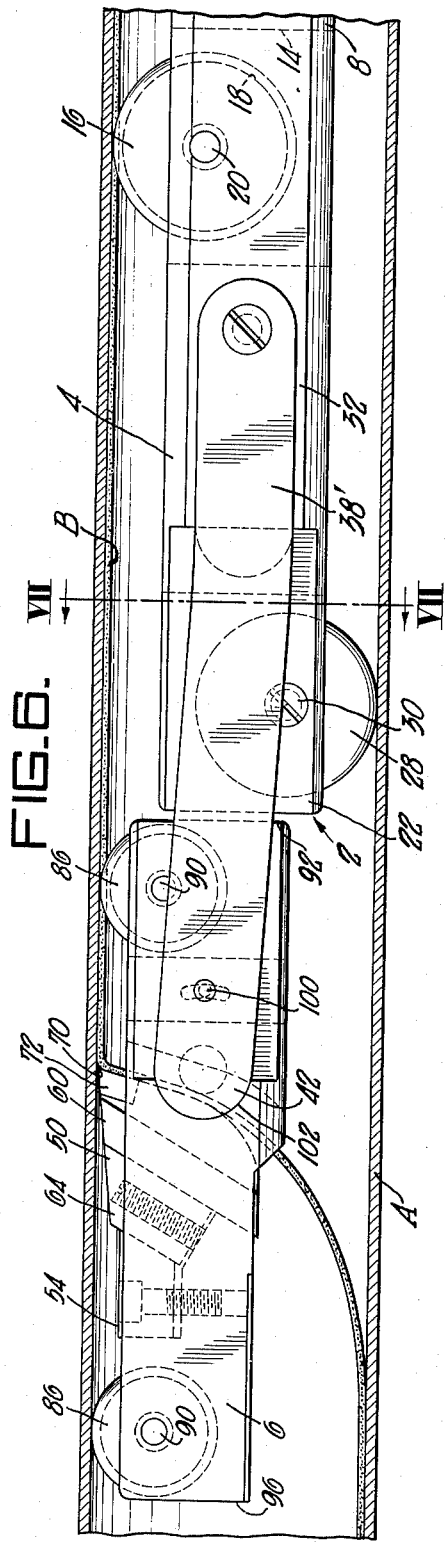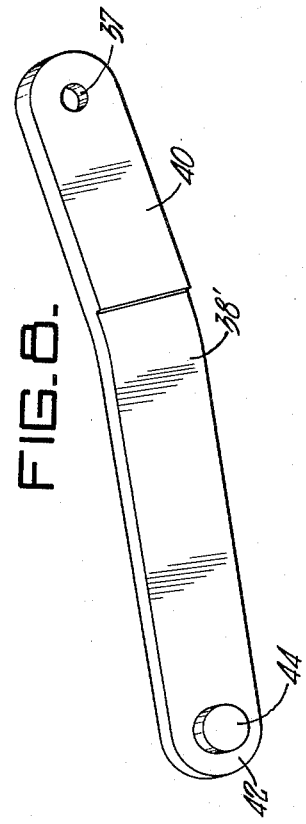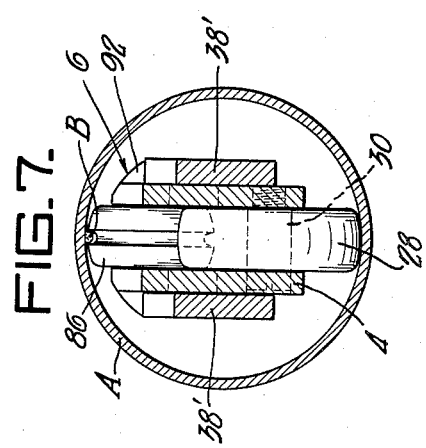

2,714,338
INSIDE FLASH TRIMMER
Russell E. Nance, Chesterton, Ind.
Application August 13, 1953, Serial No. 374,031
4 Claims. (Cl. 90—24)

The present invention relates generally to apparatus for manufacturing welded tubular products and more particularly to apparatus for trimming the inside flash or burr from longitudinally welded metal pipe or tubing during the manufacture thereof.

In the manufacture of electric resistance welded steel pipe, after the skelp or strip has been shaped into preliminary tubular form having an open seam, the spaced longitudinal edges are heated to a fusion temperature and forced together by pressure rolls or other pressure means to produce a continuous monolithic weld of the seam. As the butting edges are faced together, hot metal is extruded both outwardly and inwardly of the pipe to form a continuous burr or flash along the weld. The height, thickness and conformity of this burr or flash varies according to pipe size, width and thickness of the skelp or strip, variations in welding conditions, and the shape of the welding throat.

The removal of the flash from the outside surface of the pipe is relatively simple and may be done by any one of several conventional methods. However, trimming the flash formed on the inner surface of the pipe is more difficult and gives rise to problems that are particularly serious in high speed continuous production of welded pipe where it is highly desirable to trim the flash in the production line during the manufacture of the pipe. In certain types of pipes, it is necessary only to trim the flash to a specified thickness and in others it is necessary to remove the flash completely and cleanly from the inside of the tube. Inasmuch as physical control of the diameter size of the tube is governed by working rolls engaging the outside of the tube, a variation of the inside diameter occurs according to the variation of the thickness of the strip of skelp from which the pipe or tube is made. Various devices have been designed for trimming the inside flash of welded pipe during manufacture, but none prior to my invention have proved entirely satisfactory, since none, to my knowledge, were sufficiently flexible in operation to continuously cut the bead of welded pipe to a uniform thickness notwithstanding variations in the inside diameter of the pipe.

It is, accordingly, an object of my invention to provide an inner flash trimmer which is self-adjusting during operation to cut an inner flash to a uniform predetermined thickness in a given range of pipe diameters.

A further object of my invention is to provide an inner flash trimmer which may be readily adapted for processing pipe of various sizes.

These and other objects will become more apparent after referring to the following specification and attached drawings, in which:

Figure 1 is a plan view;
Figure 2 is a side elevational view;
Figure 3 is a vertical sectional view;
Figure 4 is a cross sectional view taken on the line IV—IV of Figure 2;
Figure 5 is a perspective view of the spring bar element of the invention;
Figure 6 is a view similar to Figure 2 of a modification of the invention;
Figure 7 is a cross sectional view taken on the line VII—VII of Figure 6; and
Figure 8 is a perspective view of the spring bar element of the modified form of the invention.

Referring more particularly to the drawings, reference numeral 2 indicates generally the body of the cutter of my invention which is shown operatively disposed within a longitudinally welded pipe A having a flash bead B on the inner surface thereof. Body 2 is articulated, having a separate roller carriage section 4 and a separate tool shank section 6 joined together in a manner to be described. The forward end 8 of the roller carriage 4 may be provided with a universal coupling 10 or other suitable connecting fixture for pivotally connecting the device to a stationary rod 12 which is fastened to and extends from a unit of the pipe producing line (not shown). The device is held in longitudinally stationary position by the rod 12. A longitudinal recess 14 is provided in the upper surface of the roller carriage 4 adjacent its end 8 for receiving a roller 16 which is provided with a peripheral groove 18. The roller 16 is rotatively mounted on a fixed shaft 20 which extends transversely through the body of the roller carriage 4. The rearward end 22 of the roller carriage 4 is provided with an open end slot 26 for receiving a roller 28. The roller 28 is rotatably mounted on a fixed shaft 30 which extends transversely through the body of the roller carriage 4. It will be seen that the roller 16 engages the upper inner surface of the pipe A with the groove 18 straddling the bead B while the roller 28 projects from the opposite side of the roller carriage to engage the bottom of the inner surface of the pipe A. The groove 18, by engaging the bead B of the pipe A as it travels longitudinally over the body 2 in the direction of the arrows, guides the pipe in its travel.

The two sides of the roller carriage 4 are provided with elongated slots or recesses 32 along the mid portion of the roller carriage. Matching threaded holes 34 extend transversely inwardly from each side of the body of the roller carriage 4 adjacent the forward ends of the slots 32. A flat head screw 36 passes through a countersunk hole 37 in each of a pair of elongated spring bars 38 and is threaded into the corresponding threaded hole 34 to fasten the bars 38 to the roller carriage one on each side thereof. Each of the spring bars 38 is provided with an inwardly directed shoulder 40 adjacent its attached end which is received into the recess 32. The rearward end 42 of each of the spring bars 38 projects longitudinally from the rear end 22 of the roller carriage and is provided with an inwardly directed integral stub 44.

The tool shank 6 is pivotally supported by the projecting portions of the spring bars 38 at a point intermediate its ends where it is provided with transverse holes 46 for receiving the stubs 44. The tool shank 6 is provided with an elongated slot 48 which extends downwardly from its upper surface to accommodate a cutter tool 50, an insert 52 and a keeper 54. The front face 56 of the cutter tool 50 is curved while the insert 52 is provided with a rear face 58 having a corresponding curvature so that a transverse inclined opening is defined between the tool and the insert that extends through the tool shank. The cutting tool 50 is provided with a lateral lug 60 extending from its top to its bottom on one side which is received in an inclined transverse slot 62 in the body of the tool shank. The rear portion 64 of the cutting tool is provided with an inclined threaded hole 66 therethrough which accommodates an adjusting screw 68. Adjusting screw 68 projects outwardly from the bottom of the cutting tool and abuts the bottom of the slot 48. The purpose of adjusting screw 68 is to adjust the position of the tool cutter 50 within the slot 48, that is, by manipulating screw 68, the cutting tool 50 may be raised or lowered relative to the body of the tool shank 6. The cutting edge 70 of the cutting tool 50 is formed on a cemented carbide tip 72 carried in the upper portion of the forward face of the cutter tool.

The keeper 54, having a vertical counterbore 76 therethrough, is positioned within the slot 48 with the counterbore 76 communicating with a threaded hole 78 in the bottom of the slot. The keeper is provided with an inclined forward face 80 which conforms to the shape of the rear portion 64 of the cutting tool 50. The keeper 54 is held in position by means of a cap screw 82 with its inclined face 80 abutting the rear face 64 of the cutting tool 50. Thus the keeper 54 keeps the cutting tool 50 locked in adjusted position.

The two ends of the tool shank 6 are provided with open end slots 84 for receiving gauge rollers 86. The gauge rollers 86 are each provided with peripheral grooves 88 and are rotatively mounted on fixed shafts 90 which extend transversely through the body of the tool shank. The gauge roller 86 on the forward end 92 of the tool shank abuts the upper surface of the inner wall of the pipe A with the groove 88 engaging the bead B thereby guiding the pipe as it travels over the tool shank. The roller 86 at the rearward end 96 of the tool shank also engages the upper surface of the inner pipe wall. The peripheral groove 88 is provided in this roller for the purpose of engaging the remnant of the flash bead remaining after it has been trimmed to desired thickness. If the bead has been completely removed, the gauge roller engages the wall surface of the pipe with no function being performed by the groove.

The spring bars 38 resiliently urge the tool shank upwardly toward the inner surface of the pipe A and the guide rollers 86 maintain a fixed spaced range constantly between the cutting edge 70 and the upper portion of the inner wall of the pipe A so that the amount of flash bead which is cut as the pipe travels continuously over the device is maintained constantly uniform notwithstanding variations in the inside diameter of the pipe due to variations in wall thickness.

Intermediate the forward wall of the slot 48 and the forward end of the tool shank 6 is located an arcuate slot 98 which extends transversely through the body of the tool shank for receiving a tie pin 100 which is fixedly attached to and extends between the projecting portions of the spring bars 38. The tie pin 100 restrains the spring bars against their natural tendency to torsionally deflect or twist under load.

As best shown in Figure 1, the forward portion of the body of the tool shank 6 is provided with undercut lateral portions 102 for accommodating the projecting ends of the spring bars 38.

In operation, the pipe to be processed is passed continuously over the longitudinally fixed trimmer of my invention with the cutting tool attached in proper position for trimming the desired amount from the thickness of the flash bead. As the pipe travels over the device, the cutting edge 70 cuts into the flash bead B causing a continuous length of material to be removed therefrom which is guided downwardly and rearwardly through the space between the insert 52 and the forward face 56 of the cutting tool. The passageway between the insert 52 and the cutting tool 50 is contoured so as to direct the flash cutting rearwardly to eliminate kinking of the flash cutting and possible plugging of the aperture.

I have found it desirable to curve the projecting ends of the spring bars when the device is to be used for processing relatively large diameter pipe which may be in excess of approximately 1¾ inches in outside diameter. Figures 6, 7 and 8 illustrate the device of my invention provided with curved spring bars 38'.

The device of my invention may be readily adapted to process increasingly larger diameter pipe by substituting the curved spring bars 38' and/or by increasing the diameter of the rollers 16 and 28. The resilient connection of the tool shank with the roller carriage together with the spacing function of the gauge rollers 86 provides the flexibility of self-adjustment needed to compensate for variations in inside diameter due to variations in wall thickness of the pipe being processed.

While two embodiments of my invention have been shown and described, it will be apparent that other adaptations and modifications may be made without departing from the scope of the following claims.

I claim:

1. Apparatus for trimming a flash bead on the inner surface of a longitudinally welded metal tube which comprises an articulated elongated body adapted to be disposed within the tube so as to permit relative longitudinal motion between the body and the tube, said body including a separate tool shank section and a separate roller carriage section arranged in longitudinal disposition, a pair of spaced rollers rotatively supported by said carriage, said rollers projecting from opposite sides of said carriage and engaging opposite lateral portions of the inner surface of said tube, elongated spring means fixedly attached to said carriage with a portion thereof projecting longitudinally from one end of the carriage, said tool shank being pivotally supported intermediate its length by the projecting portion of said spring means, said tool shank being urged toward the inner surface of said tube by said spring means, a cutting tool adjustably fixed in said tool shank with its cutting edge projecting therefrom a predetermined distance in the plane of said flash bead whereby relative longitudinal motion between said body and said tube results in the trimming of said flash bead by said cutting tool.

2. Apparatus for trimming a flash bead on the inner surface of a longitudinally welded metal tube which comprises an articulated elongated body adapted to be disposed within the tube so as to permit relative longitudinal motion between the body and the tube, said body including a separate tool shank section and a separate roller carriage arranged in longitudinal disposition, a first roller rotatively carried by said carriage adjacent one end and projecting therefrom toward said flash bead, said roller having a continuous groove in its periphery for engaging said flash bead and guiding said carriage therealong, a second roller rotatively supported by said carriage adjacent its end opposite said one end and projecting therefrom to engage a lateral portion of the inner surface of said tube opposite said flash bead, an elongated spring bar rigidly attached to opposite sides of said carriage with a portion thereof projecting longitudinally from one end of said carriage, the projecting ends of said spring bars being pivotally connected with opposite sides of said tool shank intermediate its length for resiliently supporting the same, said tool shank being urged toward said flash bead by said spring bars, and a cutting tool adjustably fixed in said tool shank with its cutting edge projecting therefrom a predetermined distance in the same horizontal plane as said flash bead whereby relative longitudinal motion between said body and said tube results in the trimming of said bead by said cutting tool, said tool shank having a generally transverse inclined opening therethrough adjacent said cutting tool for receiving the cut flash bead and conducting it away from said cutting edge.

3. Apparatus for trimming a flash bead as defined by claim 2 characterized by said tool shank having an arcuate slot extending transversely therethrough adjacent the point of pivotal connection with said spring bars in the direction toward said roller carriage, a tie pin fixedly attached at each end to said spring bars and extending therebetween through said slot.

4. Apparatus for trimming a flash bead as defined by claim 2 characterized by the projecting portions of said spring bars being curved in the direction toward the horizontal plane of said flash bead.

References Cited in the file of this patent

UNITED STATES PATENTS

| | | |
|---|---|---|
| 2,237,550 | Darner | Apr. 8, 1941 |
| 2,286,513 | Sower | June 16, 1942 |
| 2,535,653 | Schaeffer et al. | Dec. 26, 1950 |